US009968915B2

(12) United States Patent
Gao et al.

(10) Patent No.: US 9,968,915 B2
(45) Date of Patent: *May 15, 2018

(54) PHOSPHORUS-CONTAINING ULTRASTABLE Y-TYPE RARE EARTH MOLECULAR SIEVE AND PREPARATION METHOD THEREFOR

(75) Inventors: Xionghou Gao, Beijing (CN); Haitao Zhang, Beijing (CN); Di Li, Beijing (CN); Xueli Li, Beijing (CN); Hongchang Duan, Beijing (CN); Zhengguo Tan, Beijing (CN); Chaowei Liu, Beijing (CN); Yunfeng Zheng, Beijing (CN); Xiaoliang Huang, Beijing (CN); Jinjun Cai, Beijing (CN); Chenxi Zhang, Beijing (CN); Zhishuang Pan, Beijing (CN); Gengzhen Cao, Beijing (CN)

(73) Assignee: PETROCHINA COMPANY LIMITED, Beijing (CN)

( * ) Notice: Subject to any disclaimer, the term of this patent is extended or adjusted under 35 U.S.C. 154(b) by 549 days.

This patent is subject to a terminal disclaimer.

(21) Appl. No.: 14/404,774

(22) PCT Filed: Jul. 27, 2012

(86) PCT No.: PCT/CN2012/001007
§ 371 (c)(1),
(2), (4) Date: Jan. 15, 2015

(87) PCT Pub. No.: WO2013/177727
PCT Pub. Date: Dec. 5, 2013

(65) Prior Publication Data
US 2015/0209767 A1    Jul. 30, 2015

(30) Foreign Application Priority Data
Jun. 1, 2012   (CN) .......................... 2012 1 0179835

(51) Int. Cl.
*B01J 29/06* (2006.01)
*B01J 29/08* (2006.01)
*B01J 29/80* (2006.01)
*B01J 37/30* (2006.01)
*B01J 35/10* (2006.01)
*C01B 39/02* (2006.01)
*B01J 37/28* (2006.01)
*C01B 39/24* (2006.01)
*C01B 39/54* (2006.01)
*B01J 37/00* (2006.01)
*B01J 37/04* (2006.01)
(Continued)

(52) U.S. Cl.
CPC ........... *B01J 29/088* (2013.01); *B01J 29/084* (2013.01); *B01J 29/80* (2013.01); *B01J 35/10* (2013.01); *B01J 35/109* (2013.01); *B01J 37/009* (2013.01); *B01J 37/04* (2013.01); *B01J 37/06* (2013.01); *B01J 37/08* (2013.01); *B01J 37/28* (2013.01); *B01J 37/30* (2013.01); *C01B 39/026* (2013.01); *C01B 39/24* (2013.01); *C01B 39/54* (2013.01); *B01J 2229/18* (2013.01); *B01J 2229/186* (2013.01); *B01J 2229/40* (2013.01); *B01J 2229/42* (2013.01)

(58) Field of Classification Search
CPC ........ B01J 29/088; B01J 29/084; B01J 29/80; B01J 2229/40; B01J 2229/146; B01J 2229/42; B01J 35/10; B01J 35/109; B01J 37/30; B01J 37/28; B01J 2229/186; C01B 39/24; C01B 39/026
USPC ................................... 502/60, 65, 73, 79, 85
See application file for complete search history.

(56) References Cited

U.S. PATENT DOCUMENTS

2004/0254060 A1   12/2004   Du et al.

FOREIGN PATENT DOCUMENTS

| CA | 1045069 | 12/1978 |
| CN | 1217231 A | 5/1999 |
| CN | 1317547 A | 10/2001 |

(Continued)

OTHER PUBLICATIONS

Machine translation of CN 102133542, Shanxiang et al., dated Jul. 27, 2011.*

(Continued)

*Primary Examiner* — Elizabeth D Wood
(74) *Attorney, Agent, or Firm* — Meunier Carlin & Curfman LLC

(57) ABSTRACT

Provided is a phosphorus-containing ultrastable Y-type rare earth (RE) molecular sieve and the preparation method thereof. The method is: based on NaY molecular sieve as a raw material, obtaining "one-exchange one-roast" RE-Na Y-type molecular sieve through the steps of exchanging with RE, pre-exchanging with dispersing, and the first calcination; and then performing ammonium salt exchange, phosphorus modification, and the second calcination on the "one-exchange one-roast" RE-Na Y-type molecular sieve, wherein the sequence of the RE exchange and the pre-exchange with dispersing is unlimited, and the sequence of the ammonium salt exchange and the phosphorus modification is unlimited as well. The obtained molecular sieve contains RE oxide 1-20 wt %, phosphorus 0.1-5 wt %, and sodium oxide no more than 1.2 wt %, and has a crystallization degree of 51-69% and a lattice parameter of 2.449-2.469 nm. Heavy oil conversion rate can be increased by using the molecular sieve as an active component in a catalytic cracking catalyst.

20 Claims, No Drawings

(51) Int. Cl.
  *B01J 37/06*     (2006.01)
  *B01J 37/08*     (2006.01)

(56)  References Cited

FOREIGN PATENT DOCUMENTS

| | | | |
|---|---|---|---|
| CN | 1325940 | A | 12/2001 |
| CN | 1330981 | A | 1/2002 |
| CN | 1353086 | A | 6/2002 |
| CN | 1485136 | A | 3/2004 |
| CN | 1506161 | A | 6/2004 |
| CN | 1676463 | | 10/2005 |
| CN | 101285001 | A | 10/2008 |
| CN | 101391780 | A | 3/2009 |
| CN | 101284243 | | 4/2011 |
| CN | 101823726 | | 3/2012 |
| CN | 102806096 | | 12/2012 |
| EP | 0252761 | | 1/1988 |
| EP | 1795259 | A1 | 6/2007 |
| JP | S50-80288 | | 6/1975 |
| JP | S63-23745 | | 2/1988 |
| JP | 2004-526655 | | 9/2004 |

OTHER PUBLICATIONS

Machine translation of CN 101284243, Lingping et al., dated Oct. 15, 2008.*
Machine translation of CN 1506161, Liu et al. dated Jun. 23, 2004.*
First Office Action dated Apr. 7, 2015 for Chinese patent application No. 201210179835.9 and an English language machine translation of the Office Action.
Second Office Action dated Aug. 26, 2014 for Chinese patent application No. 201210179835.9 and an English language translation.
Extended European Search Report for European patent application No. 12877722 dated Nov. 20, 2015 (10 pages).
Office Action issued for corresponding Japanese Patent Application No. 2015-514312 dated Mar. 8, 2016 (3 pages).
Office Action dated Mar. 9, 2016 for counterpart Chinese patent application No. 201210179835.9 and an English translation (7 pages).
Office Action issued in related European Application No. 12877722.4, dated Sep. 6, 2016.
Office Action issued in related Japanese Application No. 2015-514312, dated Jul. 26, 2016.
Office Action issued in related Chinese Application No. 201210179835.9, dated Sep. 28, 2016 and English translation thereof.
International Search Report issued in International Application No. PCT/CN2012/001007 dated Feb. 5, 2013 (3 pages).
Written Opinion of the International Searching Authority issued in International Application No. PCT/CN2012/001007 dated Mar. 14, 2013 (10 pages).
Copending U.S. Appl. No. 14/404,776, filed Dec. 1, 2014 and the prosecution history thereof.
International Search Report issued in International Application No. PCT/CN2012/001008 dated Feb. 1, 2013 (3 pages).
Written Opinion of the International Searching Authority issued in International Application No. PCT/CN2012/001008 dated Mar. 7, 2013 (6 pages).

* cited by examiner

PHOSPHORUS-CONTAINING ULTRASTABLE Y-TYPE RARE EARTH MOLECULAR SIEVE AND PREPARATION METHOD THEREFOR

TECHNICAL FIELD

The invention relates to a phosphorus-containing ultrastable Y-type rare earth (RE) molecular sieve and a preparation method thereof more specifically, to a phosphorus-containing ultrastable RE Y-type molecular sieve capable of improving the yield of light oil and particle dispersability, and a preparation method thereof.

BACKGROUND

As a major provider for the cracking activity of a heavy oil cracking catalyst, Y-type molecular sieve having a high cracking activity and a high activity stability has been always a core technical problem of the research in the field of catalysis. Catalytic cracking process is an important process for lightweight conversion of heavy oil, also is one of the main sources for the benefits of each refinery.

In recent years, in order to improve the yield of light oil, a number of researches have been conducted by the related research institutes at home and abroad on how to improve the cracking activity and activity stability of Y-type molecular sieve. Current industrial modification methods mostly use a modified Y-type molecular sieve by rare earth ion exchange, combined with the optimization of the calcination condition to allow the rare earth ions to migrate to the sodalite cage as many as possible to inhibit the molecular sieve framework from dealumination, thereby improving the structural stability and activity stability of the molecular sieve, and achieving the object of improving the heavy oil conversion activity and selectivity of the catalyst.

To further enhance the catalytic properties of ultrastable REY molecular sieve, there have been proposed a method of phosphorus modification in relevant literatures.

CN1353086A discloses a method for preparing a Y-type molecular sieve containing phosphorus and rare earth, wherein the resultant Y-type molecular sieve cars significantly reduce the olefin content in FCC gasoline, while maintaining good coke selectivity. The method includes firstly mixing the NaY molecular sieve with ammonium ions and rare earth ions for exchange and subjecting it to a hydrothermal calcination, and then reacting it with a phosphorus compound to incorporate 0.2 to 10 wt % (in terms of $P_2O_5$) of phosphorus, followed by a hydrothermal calcination.

CN1330981A discloses a phosphorus-containing Y-type zeolite and a preparation method thereof. Said phosphorus-containing Y-type zeolite contains, in addition to phosphorus, a silicon component and a rare earth component wherein the silicon component is loaded by impregnating the zeolite with a solution of silicon compound; the content of the silicon component is 1-15 wt % in terms of $SiO_2$; the content of the phosphorus component is 0.1-15 wt % in terms of $P_2O_5$; and the content of the rare earth component is 0.2-15 wt % in terms of a rare earth oxide. The molecular sieve is obtained by co-impregnating the rare earth-containing Y-type zeolite with a solution containing silicon and phosphorus, drying and then hydrothermal calcination at 550-850° C. The phosphorus-containing Y-type zeolite has a high crystallinity and a good catalytic performance after hydrothermal treatment, while a cracking catalyst of the phosphorus-containing Y-type zeolite has a strong heavy oil conversion capacity and a good product distribution.

CN1325940A discloses a phosphorus-containing catalyst for cracking hydrocarbons and a preparation method thereof. The catalyst is composed of 10-60 wt % of Y-type molecular sieve or Y-type molecular sieve with MFI structure molecular sieve and/or β-molecular sieve, 0-75 wt % clay, 10-60 wt % of two types of alumina, 0.1-7.0 wt % of phosphorus in terms of $P_2O_5$, and 0-20 wt % of rare earth in terms of $RE_2O_3$. The catalyst is obtained by mixing the molecular sieve treated with a phosphorus-containing solution, optimally the molecular sieve untreated with the phosphorus-containing solution, with clay and double aluminum binder, calcinating at 500° C. or spray drying, and then treating with a phosphorus-containing solution. The catalyst may reduce the olefin content in the product gasoline fraction to 20-26 wt %.

CN1317517A discloses a FCC catalyst for reducing olefin content in gasoline and a preparation method thereof. The catalyst is composed of zeolite-type active component, amorphous silicon aluminum oxide and kaolin, wherein the active component is consisting of 0.5-5% (a percentage by weight relative to the FCC catalyst, the same applies hereinafter) ZSM-5, 0.5-15% RE Y-type zeolite, 20-40% phosphorus and RE composite-modified ultrastable Y-type zeolite. The phosphorus and RE composite-modified ultrastable Y-type zeolite is obtained by subjecting Na Y zeolite to mixing with RE and ammonium salt for exchange, and a hydrothermal calcination treatment, followed by a reaction with phosphorus compound, and a second calcination treatment, wherein the weight ratio of $RE_2O_3$/Y-type zeolite is 0.02-0.18, the weight ratio of ammonium salt/Y-type zeolite is 0.1-1.0, the weight ratio of P/Y-type zeolite is 0.003-0.05, the calcination temperature is 250-750° C., the steam condition is 5-100%, the duration is 0.2-3.5 hours, and the resultant zeolite has a rare earth content of 2-12%, a unit cell constant of 24.45-24.46 nm, and a phosphorus content of 0.2-3% (in terms of P). As compared with conventional catalysts, this catalyst can significantly reduce the olefin content in gasoline, while ensuring the distribution of other products and the octane number of gasoline essentially unchanged.

CN1217231A discloses a phosphorous-containing faujasite catalyst for cracking hydrocarbons and a preparation method thereof. The catalyst comprises 10-60 wt % of faujasite, 0.01-1.5 wt % of phosphorus, 0.1-40 wt % of RE oxide, 10-60 wt % of aluminum binder (in terms of aluminum oxide), and 0-75 wt % of clay, wherein the aluminum binder is from pseudo-boehmite and alumina sol respectively. The phosphorus-containing faujasite is prepared by mixing faujasite with an aqueous solution of a phosphorus-containing compound uniformly, standing for 0-8 hours, drying and calcinating at 450-600° C. for 0.5 hour or more.

None of the phosphorus modification methods for RE Y-type molecular sieve provided in the above patent documents specifies the precise localization of rare earth ions and the dispersability of the molecular sieve. However, in the ultrastable RE Y-type molecular sieve containing phosphorus and rare earth involved in this invention, the rare earth ions could be precisely located in sodalite cages, and it is characterized by improving both particle dispersability and light oil yield due to the incorporation of a dispersant and a phosphorus-containing compound.

SUMMARY OF THE INVENTION

The object of the present invention is to provide an ultrastable RE Y-type molecular sieve having high activity and stability and the preparation method thereof. The molecular sieve provided by such a method has low coke production rate, high yield of light oil, and strong capacity of heavy oil conversion and resistance to heavy metals, while the method is characterized by simply preparation process, high utilization of elements for modification and low ammonia nitrogen pollution.

The invention provides a phosphorus-containing ultrastable RE Y-type molecular sieve, characterized in that the molecular sieve contains 1-20 wt % of RE oxide, 0.1-5 wt % of phosphorus in terms of P, and not more than 1.2 wt % of sodium oxide, and has a crystallinity of 51-69% and a lattice parameter of 2.449-2.469 nm; the preparation process of the molecular sieve includes RE exchange and dispersion pre-exchange, where the RE exchange and the dispersion pre-exchange can be carried out in an unlimited sequence, and are carried out continuously without a calcination process therebetween; the dispersion pre-exchange refers to adjusting the slurry of the molecular sieve to have a concentration, in terms of a solid content, of 80-400 g/L, and adding thereto 0.2 wt % to 7 wt % of a dispersant to conduct the dispersion pre-exchange at an exchange temperature of 0 to 100° C. for an exchange duration of 0.1 to 1.5 hours; in the dispersion pre-exchange, the dispersant is selected from any one or more of sesbania powder, boric acid, urea, ethanol, polyacrylamide, acetic acid, oxalic acid, adipic acid, formic acid, hydrochloric acid, nitric acid, citric acid, salicylic acid, tartaric acid, benzoic acid and starch; no ammonium salt is used in the RE exchange and the dispersion pre-exchange.

More particularly, the invention provides a method for preparing the phosphorus-containing ultrastable RE Y-type molecular sieve, wherein, with NaY molecular sieve (preferably having a Si/Al ratio of greater than 4.0, and a degree of crystallinity of greater than 70%) as a raw material, "one-exchanged one-calcinated" rare earth sodium (RE-Na) Y-type molecular sieve is obtained through the steps of RE exchange, dispersion pre-exchange, and the first calcination; and then the "one-exchanged one-calcinated" RE-Na Y-type molecular sieve is subjected to ammonium salt exchange, phosphorus modification, and the second calcination, wherein the ammonium salt exchange and the phosphorus modification are carried out in an unlimited sequence, and the second calcination is carried out after reducing sodium by the ammonium salt exchange.

In the present invention, the RE exchange, ammonium salt exchange, phosphorus modification, the first calcination, the second calcination and the like are all familiar processes for exchange modification and ultrastabilization in the industry; and general conditions are used and are not limited in the invention. For example, the ammonium salt exchange may be carried continuously or discretely; the phosphorus modification may be adjusting the slurry of the molecular sieve to have a concentration, in terms of a solid content, of 80-400 g/L, and adding thereto 0.1 wt % to 5 wt % (in terms of elementary P) of a phosphorus-containing compound for exchange at an exchange temperature of 0 to 100° C. for an exchange duration of 0.1 to 1.5 hours; during the exchange, the phosphorus-containing compound is selected from any one or more of phosphoric acid, phosphorous acid, phosphoric anhydride, diammonium phosphate, monoammonium phosphate, triammonium phosphate, triammonium phosphite, monoammonium phosphite, and aluminum phosphate.

The method for preparing the phosphorus-containing ultrastable RE Y-type molecular sieve provided in the invention may be a process in which, with NaY molecular sieve (preferably having a Si/Al ratio of greater than 4.0, and a degree of crystallinity of greater than 70%) as a raw material, "one-exchanged one-calcinated" RE-Na Y-type molecular sieve is obtained through the steps of RE exchange, dispersion pre-exchange, and the first calcination, wherein the RE exchange and the dispersion pre-exchange are carried out in an unlimited sequence; and then the "one-exchanged one-calcinated" RE-Na Y-type molecular sieve is subjected to ammonium salt exchange for reducing sodium, and phosphorus modification wherein the ammonium salt exchange for reducing sodium and the phosphorus modification are carried out in an unlimited sequence, and is subsequently subjected to the second calcination; or then the "one-exchanged one-calcinated" RE-Na Y-type molecular sieve is subjected to the ammonium salt exchange for reducing sodium, and then to the second calcination followed by beating the filter cake before the phosphorus modification, so that the product of the invention, REUSY molecular sieve (also called ultrastable RE Y-type molecular sieve) is obtained.

In the present invention, the condition for the RE exchange is a general condition for RE exchange, for example, it may be adjusting the slurry of the molecular sieve to have a concentration of 80-400 g/L (on dry basis), and adding thereto an amount of a RE compound in terms of $RE_2O_3$ such that the ratio (by mass) of $RE_2O_3$/Y-type zeolite is 0.005 to 0.25, at an exchange temperature of 0 to 100° C. and an exchange pH of 2.5 to 6.0 for an exchange duration of 0.1 to 2 hours. The general condition may be also used as the calcination condition, for example, the first calcination condition may be calcinating at 350° C. to 700° C. with 0 to 100% steam for 0.3 to 3.5 hours; and the second calcination condition may be calcinating at 450° C. to 700° C. with 0 to 100% steam for 0.3 to 3.5 hours, most preferably 0.5 to 2.5 hours.

In the present invention, between the RE exchange and the dispersion pre-exchange of the NaY molecular sieve, the molecular sieve may be not washed or filtered, or may be washed and filtered. During the RE exchange, the ratio (by mass) of $RE_2O_3$/Y-type zeolite is preferably 0.005 to 0.25, and most preferably 0.01 to 0.20; the exchange temperature is 0 to 100° C., and most preferably 60 to 95° C.; and the exchange pH is 2.5 to 6.0, and most preferably 3.5 to 5.5; and the exchange duration is 0.1 to 2 hours, and most preferably 0.3 to 1.5 hours. During the dispersion pre-exchange, the addition amount of the dispersant is 0.2 wt % to 7 wt %, and most preferably 0.2 wt % to 5 wt %; the exchange temperature is 0 to 100° C., and most preferably 60 to 95° C.; the exchange duration is 0.1 to 1.5 hours. The modified slurry of the molecular sieve is filtered and washed by water to obtain a filter cake, and the resultant filter cake is dried by flash evaporation to a moisture content of 30% to 50%, followed by the first calcination, in which the condition may be a general condition, for example, calcinating at 350° C. to 700° C. with 0 to 100% steam for 0.3 to 3.5 hours, and most preferably calcinating at 450° C. to 650° C. with 15 to 100% steam for 0.5 to 2.5 hours, so as to obtain the "one-exchanged one-calcinated" ultrastable RE-Na Y-type molecular sieve. The preparation process of "twice-exchanged twice-calcinated" includes ammonium salt exchange and phosphorus modification. The condition for the ammonium salt exchange may be a common practice generally used, and a method is recommended to add the "one-exchanged one-calcinated" ultrastable RE-Na Y-type molecular sieve into deionized water; adjust it to a solid content of 100-400 g/L, the ratio (by mass) of $NH_4^+$/Y-type zeolite of 0.02 to 0.40, most preferably 0.02 to 0.30, and a pH of 2.5 to 5.0, most preferably 3.0 to 4.5; and react at 60 to 95° C. for 0.3 to 1.5 hours. In the phosphorus modification, the addition amount of the phosphorus-containing compound is 0.1 wt % to 5 wt % (in terms of elementary P), most preferably 0.2 wt % to 4 wt % (in terms of elementary P); the exchange temperature is 0 to 100° C., most preferably 20 to 80° C.; and the exchange duration is 0.1 to 1.5 hours. After the completion of reaction, the slurry of the molecular sieve is filtered and washed by water, and the obtained filter cake is calcinated at 450° C. to 700° C. with 0 to 100% steam for 0.3 to 3.5 hours, most preferably 0.5 to 2.5 hours, to eventually obtain the highly-active, ultrastable RE Y-type molecular sieve provided in the invention.

During the preparation of the molecular sieve according to the invention, the "one-exchanged one-calcinated" ultrastable RE-Na Y-type molecular sieve may be prepared by a process of firstly subjecting the NaY molecular sieve to the RE exchange, and filtering and washing it after the completion of reaction; subsequently mixing the filter cake with the dispersant uniformly for a pre-exchange reaction; and finally subjecting the filter cake to a drying by flash evaporation before the calcination.

During the preparation of the molecular sieve according to the invention, the "one-exchanged one-calcinated" ultrastable RE-Na Y-type molecular sieve may be prepared by a process of firstly subjecting the NaY molecular sieve to the dispersion pre-exchange, and filtering and washing it after the completion of reaction; mixing the filter cake with a solution of the RE compound uniformly for filter cake exchange; and subjecting the filter cake to a drying by flash evaporation before the calcination, after the completion of the reaction.

During the preparation of the molecular sieve according to the invention, the "one-exchanged one-calcinated" ultrastable RE-Na Y-type molecular sieve may be prepared by a process of firstly subjecting the NaY molecular sieve to the dispersion pre-exchange; subsequently adding thereto the RE compound for tank-type exchange; and performing filtering, washing and calcinating after the completion of the reaction.

During the preparation of the molecular sieve according to the invention, the "one-exchanged one-calcinated" ultrastable RE-Na Y-type molecular sieve may be prepared by a process of firstly subjecting the NaY molecular sieve to the RE exchange; adding thereto the dispersant for dispersion pre-exchange reaction after the completion of reaction; and finally performing filtering, washing and calcinating.

During the preparation of the molecular sieve according to the invention, the "one-exchanged one-calcinated" ultrastable RE-Na Y-type molecular sieve may be prepared by a process of firstly subjecting the NaY molecular sieve to the dispersion pre-exchange; subjecting the slurry of the molecular sieve to filtering, RE belt exchange and water-washing of the filter cake on a belt filter after the completion of reaction, wherein the RE belt exchange is carried out on the belt filter under a condition of an exchange temperature of 60 to 95° C., an exchange pH of 3.2 to 4.8, and a vacuum degree of 0.03 to 0.05 in the belt filter; and finally subjecting the filtered and water-washed filter cake to calcination.

During the preparation of the molecular sieve according to the invention, the "one-exchanged one-calcinated" ultrastable RE-Na Y-type molecular sieve may also be prepared by a process of firstly subjecting the NaY molecular sieve to the RE exchange; subjecting the slurry of the molecular sieve to filtering, belt dispersion pre-exchange and water-washing of the filter cake on a belt filter after the completion of reaction, wherein the belt dispersion pre-exchange is carried out on the belt filter under a condition of an addition amount of 0.2 wt % to 7 wt %, an exchange temperature of 0 to 100° C., an exchange duration of 0.1 to 1.5 hours, and a vacuum degree of 0.03 to 0.05 in the belt filter; and finally subjecting the filtered and water-washed filter cake to calcination.

The "one-exchanged one-calcinated" ultrastable RE-Na Y-type molecular sieve in the invention may also be prepared by a process of performing, after the completion of the dispersion pre-exchange of the NaY molecular sieve, the RE exchange in a manner such that the solution of the RE compound is divided into several portions for tank-type exchange, belt exchange and/or filter cake exchange with a provision of the total amount of RE unchanged.

The "one-exchanged one-calcinated" ultrastable RE-Na Y-type molecular sieve in the invention may also be prepared by a process of performing the dispersion pre-exchange of the NaY molecular sieve in a manner such that the dispersant is divided into several portions for tank-type exchange, belt exchange and/or filter cake exchange with a provision of the total amount of the dispersant unchanged.

The "one-exchanged one-calcinated" ultrastable RE-Na Y-type molecular sieve in the invention may also be prepared by a process of firstly selecting a kind of dispersant for performing the dispersion pre-exchange together with the NaY molecular sieve; subsequently performing the RE exchange reaction; and adding thereto another kind of dispersant for a second dispersion pre-exchange after the completion of reaction, wherein the molecular sieve may be filtered or not filtered between the two dispersion pre-exchanges.

The phosphorus-containing ultrastable RE-Na Y-type molecular sieve provided in the invention may be prepared by a process of subjecting the "one-exchanged one-calcinated" molecular sieve to an exchange reaction with ammonium salt; subsequently performing the phosphorus modification reaction, wherein the molecular sieve may be filtered or nor filtered between the two reactions; and then performing calcination, that is, being prepared by a process of "twice-exchange twice-calcination".

The phosphorus-containing ultrastable RE-Na Y-type molecular sieve provided in the invention may be prepared by a process of subjecting the "one-exchanged one-calcinated" molecular sieve to an exchange reaction with ammonium salt, optionally filtering, followed by calcinating, and then rebeating it and performing the phosphorus modification reaction.

The implementing effect of the invention will be not affect by the different sequence of the reaction processes in the invention.

The RE compound in the invention is RE chloride, RE nitrate or RE sulfate, most preferably RE chloride or RE nitrate.

The RE in the invention may be lanthanum-rich RE or cerium-rich RE, or pure lanthanum or pure cerium.

DETAILED DESCRIPTION OF PREFERRED EMBODIMENT

The invention is further described using Examples, but the invention is not limited thereto.
(I) Methods for Analysis and Evaluation Used in the Examples
  1. Unit cell constant ($a_0$): X-ray diffraction.
  2. Crystallinity ($C/C_0$): X-ray diffraction.
  3. Si/Al ratio: X-ray diffraction.
  4. $Na_2O$ content: flame photometry.

5. RE$_2$O$_3$ content: colorimetry.
6. P content: spectrophotometry.
7. Particle size: using MICRO-PLUS laser particle size analyzer as the instrument with complete the theory applied to the full measuring range in a test range of 0.05 to 550 μm.
(II) Specification of Raw Materials Used in Examples
1. NaY molecular sieves: NaY-1 (Si/Al ratio: 4.8, crystallinity: 92%), NaY-2 (Si/Al ratio: 4.1, crystallinity: 83%), manufactured by Lanzhou Petrochemical Company, Catalyst Plant.
2. Ultrastable "one-exchanged one-calcinated" molecular sieve samples: crystallinity 60%, sodium oxide 4.3 m %, manufactured by Lanzhou Petrochemical Company, Catalyst Plant.
3. Rare earth solutions: RE chloride (RE oxide: 277.5 g/L), RE nitrate (RE oxide: 252 g/L), both of which are of industrial grade and purchased from Lanzhou Petrochemical Company, Catalyst Plant.
4. Sesbania powder, boric acid, urea, ethanol, polyacrylamide, oxalic acid, adipic acid, acetic acid, formic acid, hydrochloric acid, nitric acid, citric acid, salicylic acid, tartaric acid, and starch, all of which are chemically pure; ammonium chloride, ammonium nitrate, ammonium sulfate, ammonium oxalate, phosphoric acid, phosphorous acid, phosphoric anhydride, diammonium phosphate, monoammonium phosphate, triammonium phosphate, triammonium phosphite, monoammonium phosphite, and aluminum phosphate, all of which are of industrial grade.
(III) Evaluation of Reactions
ACE heavy oil microreactor: the reaction temperature was 530° C., the catalyst/oil ratio was 5, and the raw oil was Xinjiang oil blended with 30% vacuum residuum.

Example 1

To a reaction kettle equipped with a heating mantle, 3000 g NaY-1 molecular sieve (on dry basis) and a certain amount of deionized water were consecutively added and blended into a slurry having a solid content of 220 g/L, and 82 g boric acid and 105 g sesbania powder were added thereto. The temperature was raised to 85° C., and an exchange reaction was carried out for 0.5 h under stirring, followed by filtration and washing; the resultant filter cake was placed in a reaction kettle, and then 1.6 L RE chloride was added. The system pH was adjusted to 4.0, the temperature was elevated to 80° C., and an exchange reaction was carried out for 0.3 h. The resultant filter cake was dried by flash evaporation such that the moisture content thereof was 30% to 50%, and was finally calcinated at 670° C. with 70% steam for 1.0 h to produce a "one-exchanged one-calcinated" RE-Na Y. To a reaction kettle equipped with a heating mantle, 500 g of the "one-exchanged one-calcinated" ultrastable RE-Na Y-type molecular sieve (on dry basis) and a certain amount of deionized water were added to prepare a slurry having a solid content of 120 g/L, to which 120 g ammonium sulfate was added. The system pH was adjusted to 4.2, the temperature was raised to 90° C., and an exchange reaction was carried out for 0.8 h, followed by filtration and washing. The inter cake was beaten and then 115 g of diammonium phosphate was added thereto and mixed uniformly, and then it was calcinated at 560° C. with 80% steam for 2.5 h to produce an active component, the phosphorus-containing ultrastable Y-type RE molecular sieve according to the invention, designated as Modified Molecular Sieve A-1.

Example 2

To a reaction kettle equipped with a heating mantle, 3000 g NaY-1 molecular sieve (on dry basis) and a certain amount of deionized water were consecutively added and blended into a slurry having a solid content of 360 g/L, and 0.82 L rare earth nitrate was added thereto. The system pH was adjusted to 3.3, the temperature was raised to 80° C., and an exchange reaction was carried out for 1.5 h, followed by filtration and washing. The resultant filter cake was placed in a reaction kettle, to which 202 g polyacrylamide and 30 g salicylic acid were then added. The temperature was then elevated to 78° C. for the dispersion exchange, and the exchange reaction was carried out for 0.5 h under stirring. The resultant filter cake was dried by flash evaporation such that the moisture content thereof was 30% to 50%, and was finally calcinated at 630° C. with 30% steam for 1.8 h to produce a "one-exchanged one-calcinated" RE-Na Y. To a reaction kettle equipped with a heating mantle, 500 g of the "one-exchanged one-calcinated" ultrastable RE-Na Y-type molecular sieve (on dry basis) and deionized water were added to prepare a slurry having a solid content of 370 g/L, to which 200 g ammonium sulfate was added, and then 64 g diammonium phosphate was added. The system pH was adjusted to 3.6, the temperature was raised to 90° C., and an exchange was carried out for 1.2 h, followed by filtration and washing. The filter cake was calcinated at 600° C. with 20% steam for 0.5 h to produce an active component, the ultrastable RE Y-type molecular sieve according to the invention, designated as Modified Molecular Sieve A-2.

Comparative Example 1

This comparative example demonstrates the performance and property of an REUSY prepared without the dispersion pre-exchange in the modification of the molecular sieve.
An REUSY molecular sieve was prepared according to the method described in Example 2, and the procedure was the same as that in Example 2 with the only exception that no polyacrylamide and salicylic acid were added for the dispersion exchange. The resultant ultrastable RE Y-type molecular sieve was designated as DB-1.

Example 3

To a reaction kettle equipped with a heating mantle, 3000 g NaY-1 molecular sieve (on dry basis) and deionized water were consecutively added and blended into a slurry having a solid content of 100 g/L, and 43 g hydrochloric acid was then added thereto for the dispersion pre-exchange. The temperature was raised to 85° C., and the exchange reaction was carried out for 0.5 h. After that, 1.08 L RE chloride was added thereto. The system pH was adjusted to 4.5, the temperature was raised to 85° C., and an exchange reaction was carried out for 1 h. Subsequently 180 g citric acid was added thereto for the dispersion exchange, and then the temperature was raised to 85° C., and the exchange reaction was carried out for 0.5 h under stirring, followed by filtration and washing. The resultant filter cake was dried by flash evaporation such that the moisture content thereof was 30% to 50%, and was finally calcinated at 540° C. with 40% steam for 1.5 h to produce a "one-exchanged one-calcinated" ultrastable RE-Na Y. To a reaction kettle equipped with a heating mantle, 500 g of the "one-exchanged one-calcinated" ultrastable RE-Na Y-type molecular sieve (on dry basis) and deionized water were added to prepare a slurry having a solid content of 145 g/L, to which 80 g ammonium sulfate was added. The system pH was adjusted to 3.5, the temperature was raised to 90° C., and an exchange reaction was carried out for 1.2 h, followed by filtration and washing. The filter cake was calcinated at 650° C. with 50% steam for 2 hours, and then was rebeaten. 110 g monoammonium phosphate was added thereto and mixed uniformly, and the exchange was carried out for 1 h, followed by filtration, washing and drying, so as to produce an active component, the phosphorus-containing ultrastable RE Y-type molecular sieve according to the invention, designated as Modified Molecular Sieve A-3.

Example 4

To a reaction kettle equipped with a heating mantle, 3000 g NaY-1 molecular sieve (on dry basis) and deionized water were consecutively added and blended into a slurry having a solid content of 200 g/L, and 32 g HCl was added thereto. The temperature was raised to 85° C., and an exchange reaction was carried out for 0.5 h. Then, 0.22 L rare earth chloride was added. The system pH was adjusted to 4.8, the temperature was raised to 70° C., and an exchange reaction was carried out for 1 h. Subsequently, 48 g urea was added for the dispersion exchange, the temperature was raised to 85° C., and the exchange reaction wax earned out for 0.8 h under stirring, followed by filtration and washing. The resultant filter cake was placed in a reaction kettle, to which 1.43 L RE chloride were then added. The temperature was then elevated to 78° C., and an exchange was carried out for 0.5 h. Then the resultant filter cake wax dried by flash evaporation such that the moisture content thereof was 30% to 50%, and was finally calcinated at 540° C. with 40% steam for 1.5 h to produce a "one-exchanged one-calcinated" RE-Na Y. To a reaction kettle equipped with a heating mantle, 500 g of the "one-exchanged one-calcinated" ultrastable RE-Na Y molecular sieve (on dry basis) and deionized water were added to prepare a slurry having a solid content of 145 g/L, to which 80 g ammonium sulfate was added. The system pH was adjusted to 3.5, the temperature was raised to 90° C., and an exchange was carried out for 1.2 h. Then 55 g diammonium phosphate was added thereto and reacted for 2 h, followed by filtration and washing. The filter cake was calcinated at 650° C. with 50% steam for 2 h to produce an active component, the phosphorus-containing ultrastable RE Y-type molecular sieve according to the invention, designated as Modified Molecular Sieve A-4.

Example 5

To a reaction kettle equipped with a heating mantle, 3000 g NaY-1 molecular sieve (on dry basis) and deionized water were consecutively added and blended into a slurry having a solid content of 250 g/L, to which 132 g urea was added. The temperature was raised to 60° C., and an exchange reaction was carried out for 0.8 h under stirring. Then, 0.76 L RE chloride was added. The system pH was adjusted to 4.2, the temperature was raised to 85° C., and an exchange reaction was carried out for 1.5 h, followed by filtration and washing. The resultant filter cake wax placed in a reaction kettle, to which 39 g adipic acid was then added. The temperature was then elevated to 78° C. for the dispersion exchange, and the exchange reaction was carried out for 0.5 h under stirring. After the completion of the reaction, filtration and washing were carried out, and the resultant filter cake was dried by flash evaporation such that the moisture content thereof was 30% to 50%, and was finally calcinated at 560° C. with 80% steam for 2 h to produce a "one-exchanged one-calcinated" RE-Na Y. To a reaction kettle equipped with a heating mantle, 500 g of the "one-exchanged one-calcinated" ultrastable RE-Na Y molecular sieve (on dry basis) and deionized water were added to prepare a slurry having a solid content of 180 g/E, to which 100 g ammonium sulfate was added. The system pH was adjusted to 4.0, the temperature was raised to 90° C., and an exchange was carried out for 1 h, followed by filtration and washing. The filter cake was calcinated at 620° C. with 100% steam for 2 h, and then rebeaten. 55 g diammonium phosphate was added thereto and mixed uniformly, and reacted at a temperature of 90° C. for 1.5 h, followed by calcinating at 620° C. with 100% steam for 2 h to produce an active component, the phosphorus-containing ultrastable RE Y-type molecular sieve according to the invention, designated as Modified Molecular Sieve A-5.

Example 6

To a reaction kettle equipped with a heating mantle, 3000 g NaY-1 molecular sieve (on dry basis) and deionized water were consecutively added and blended into a slurry having a solid content of 90 g/E, and 59 g HCl was added thereto to adjust the system pH to 3.8. The temperature was raised to 90° C., and an exchange reaction was carried out for 1 h under stirring. Then, 0.54 L RE nitrate was added. The system pH was adjusted to 3.7, the temperature was raised to 80° C., and an exchange reaction was carried out for 0.5 h. When the reaction was completed, 67 g ethanol was added, and a reaction was carried out at 76° C. for 0.6 h, followed by filtration and washing. The resultant filter cake was dried by flash evaporation such that the moisture content thereof was 30% to 50%, and was finally calcinated with 70% steam at 450° C. for 2 h to produce a "one-exchanged one-calcinated" RE-Na Y. To a reaction kettle equipped with a heating mantle, 500 g of the "one-exchanged one-calcinated" ultrastable RE-Na Y molecular sieve (on dry basis) and deionized water were added to prepare a slurry having a solid content of 300 g/L, to which 175 g ammonium sulfate was added. The system pH was adjusted to 4.3, the temperature was raised to 90° C., and an exchange was carried out for 0.6 h. Then 82 g diammonium phosphate was added and reacted for 1.2 h, followed by filtration and washing. The filter cake was calcinated at 650° C. with 70% steam for 1.5 h to produce an active component, the phosphorus-containing ultrastable RE Y-type molecular sieve according to the invention, designated as Modified Molecular Sieve A-6.

Example 7

To a reaction kettle equipped with a heating mantle, 3000 g NaY-1 molecular sieve (on dry basis) and a certain amount of deionized water were consecutively added and blended into a slurry having a solid content of 180 g/L, and 1.46 L RE nitrate was added thereto. The system pH was adjusted to 3.5, the temperature was raised to 85° C., and an exchange reaction was carried out for 1.2 h. Then, 56 g ethanol and 32 g HCl were added. The temperature was raised to 90° C., and an exchange reaction was carried out for 1 h under stirring, followed by filtration and washing. The resultant filter cake was dried by flash evaporation such that the moisture content thereof was 30% to 50%, and was finally calcinated at 520° C. with 50% steam for 1.5 h to produce a "one-exchanged one-calcinated" RE-Na Y. To a reaction kettle equipped with a heating mantle, 500 g of the "one-exchanged one-calcinated" ultrastable RE-Na Y molecular sieve (on dry basis) and deionized water were added to prepare a slurry having a solid content of 250 g/L, to which 150 g ammonium sulfate was added. The system pH was adjusted to 4.0, the temperature was raised to 90° C., 72 g triammonium phosphate was added thereto and an exchange was carried out for 1 h followed by filtration and washing. The filter cake was calcinated at 650° C. with 100% steam for 2 h, so as to produce an active component, the phosphorus-containing ultrastable RE Y-type molecular sieve according to the invention, designated as Modified Molecular Sieve A-7.

Example 8

To a reaction kettle equipped with a heating mantle, 3000 g NaY-1 molecular sieve (on dry basis) and deionized water were consecutively added and blended into a slurry having a solid content of 150 g/L, to which 43 g HCl was added, and a reaction was carried out at 85° C. for 1 h. Then, 1.68 L RE chloride was added. The system pH was adjusted to 3.7, the temperature was raised to 90° C., and an exchange reaction was carried out for 1 h. The slurry of the molecular sieve was then filtered and subjected to a belt exchange with a dispersant. The condition for the belt exchange was as follows: 35 g oxalic acid was formulated into a solution of pH 3.4, the temperature was raised to 85° C., and the vacuum degree in the belt filter was 0.04. Then the resultant filter cake was dried by flash evaporation such that the moisture content thereof was 30% to 50%, and was finally calcinated with 10% steam at 510° C. for 2.0 h to produce a "one-exchanged one-calcinated" RE-Na Y. To a reaction kettle equipped with a heating mantle, 500 g of the "one-exchanged one-calcinated" ultrastable RE-Na Y molecular sieve (on dry basis) and deionized water were added to prepare a slurry having a solid content of 145 g/L, to which 80 g ammonium sulfate was added. The system pH was adjusted to 3.5, the temperature was raised to 90° C., 144 g triammonium phosphate was added thereto, and an exchange was carried out for 1.2 h, followed by filtration and washing. The filter cake was calcinated with 50% steam at 650° C. for 2 h to produce an active component, the phosphorus-containing ultrastable RE Y-type molecular sieve according to the invention, designated as Modified Molecular Sieve A-8.

Comparative Example 2

This comparative example demonstrates the performance and properly of an REUSY prepared without the dispersion pre-exchange in the modification of the molecular sieve.

An REUSY molecular sieve was prepared by the same procedure according to the method described in Example 8 with the only exception that the dispersion pre-exchange with oxalic acid was not carried out. The resultant ultrastable RE Y-type molecular sieve was designated as DB-2.

Example 9

To a reaction kettle equipped with a heating mantle, 3000 g NaY-1 molecular sieve (on dry basis) and a certain amount of deionized water were consecutively added and blended into a slurry having a solid content of 180 g/L, and 167 g tartaric acid was added thereto. Then the temperature was raised to 85° C., and an exchange reaction was carried out for 0.5 h under stirring. Thereafter, 32 g ethanol was added, and a reaction was carried out at 85° C. for 0.5 h, followed by filtration and washing. The resultant filter cake was placed into a reaction kettle, to which 1.31 L RE nitrate was added. The system pH was adjusted to 3.8, the temperature was raised to 80° C., and an exchange reaction was carried out for 1 h. The resultant filter cake was eventually dried by flash evaporation such that the moisture content thereof was 30% to 50%, and was calcinated with 100% steam at 480° C. for 1.5 h to produce a "one-exchanged one-calcinated" RE-Na Y. To a reaction kettle equipped with a heating mantle, 500 g of the "one-exchanged one-calcinated" ultrastable RE-Na Y molecular sieve (on dry basis) and deionized water were added to prepare a slurry having a solid content of 220 g/L, to which 80 g ammonium sulfate was added. The system pH was adjusted to 4.5, the temperature was raised to 90° C., 55 g monoammonium phosphate and 72 g triammonium phosphate were added, and an exchange was carried out for 0.5 h, followed by filtration and washing. The filter cake was calcinated with 100% steam at 580° C. for 1.8 h, so as to produce an active component, the phosphorus-containing ultrastable RE Y-type molecular sieve according to the invention, designated as Modified Molecular Sieve A-9.

Example 10

To a reaction kettle equipped with a heating mantle, 3000 g NaY-1 molecular sieve (on dry basis) and a certain amount of deionized water were consecutively added and blended into a slurry having a solid content of 320 g/L, to which 30 g nitric acid was added. Then the temperature was raised to 85° C., and an exchange reaction was carried out for 0.8 h under stirring. Thereafter, 0.95 L RE nitrate was added. The system pH was adjusted to 3.3, the temperature was raised to 80° C., and an exchange reaction was carried out for 1.8 h. Then 62 g starch was added, and a reaction was carried out at 80° C. for 0.5 h, followed by filtration and washing alter the completion of the reaction. The resultant filter cake was dried by flash evaporation such that the moisture content thereof was 30% to 50%, and was finally calcinated with 60% steam at 560° C. for 2 h to produce a "one-exchanged one-calcinated" RE-Na Y. To a reaction kettle equipped with a heating mantle, 500 g of the "one-exchanged one-calcinated" ultrastable RE-Na Y molecular sieve (on dry basis) and deionized water were added to prepare a slurry having a solid content of 280 g/L, to which 130 g ammonium sulfate was added. The system pH was adjusted to 4.0, the temperature was raised to 90° C., 59 g diammonium phosphate and 70 g triammonium phosphate were added, and an exchange was carried out for 0.5 h, followed by filtration and washing. The filter cake was calcinated with 60% steam at 680° C. for 1 h to produce an active component, the phosphorus-containing ultrastable RE Y-type molecular sieve according to the invention, designated as Modified Molecular Sieve A-10.

Comparative Example 3

In this comparative example, the molecular sieve preparation method described in Example 1 of CN101088917A was used, while the other conditions were the same as those in present Example 4.

At room temperature, 21 g $H_3PO_4$ (85%, analytically pure, Beijing chemical works) was added into 400 g water and dissolved, and slowly added into 120 g alumina sol under mechanical stirring, and stirred continuously for 1 h. 25% aqueous ammonia (analytically pure, produced by Beijing chemical works) was added to adjust the pH to 5.6 and stirred continuously for 2 h. A modifier containing phosphorus and aluminum in a molar ratio of phosphorus/aluminum of 0.35 was obtained.

To a reaction kettle equipped with a heating mantle, 10 L deionized water and 1000 g NaY molecular sieve (on dry basis) were consecutively added and blended into a slurry having a solid content of 150 g/L. 575 ml $RECl_3$ solution of 231 g/L was added thereto, and stirred at 90° C. for 1 h, followed by filtration and drip washing. Then the filter cake was calcinated with 100% steam at 600° C. for 2 h, to obtain a dry powder of the molecular sieve. 1000 g such dry powder of the molecular sieve was rebeaten with 10 L deionized water, to which then 500 g solid ammonium chloride was added, and an exchange was carried out at 75° C. for 1 h. The product is obtained by drying the resultant in an oven after filtration and drip washing, and designated as DB-3.

Comparative Example 4

In this comparative example, the molecular sieve preparation method described in CN1330982A was used, while the other conditions were the same as those in Example 7.

3000 g (on dry basis) of an ultrastable "one-exchanged one-calcinated" molecular sieve sample, manufactured hydrothermally by Lanzhou Petrochemical Company, Catalyst Plant, was weighed. 240 g diammonium phosphate (analytically pure, produced by Beijing chemical works) was dissolved in 600 g deionized water and mixed uniformly, and then added into 240 silica sol (commercially available from Beijing Changhong chemical works, containing 12 wt % $SiO_2$) and mixed uniformly, to obtain a solution containing phosphorus compound and silicon compound, 270 g the above "one-exchanged one-calcinated" zeolite was impregnated with the obtained solution, and then dried at 120° C., so as to obtain the molecular sieve sample of this comparative example, designated as DB-4.

The physical and chemical properties of the ultrastable RE Y-type molecular sieves prepared in the Examples and Comparative Examples in the present invention are listed in Table 1.

TABLE 1

Physical and chemical properties of molecular sieves

| Molecular Sieve No. | RE Oxide m % | Sodium Oxide m % | phosphorus m % | Lattice parameter um | Relative Crystallinity % |
|---|---|---|---|---|---|
| A-1 | 15.35 | 1.09 | 0.96 | 2.467 | 52 |
| A-2 | 6.79 | 0.95 | 0.58 | 2.463 | 59 |
| A-3 | 10.05 | 0.92 | 1.1 | 2.463 | 57 |
| A-4 | 15.33 | 0.99 | 0.54 | 2.468 | 53 |
| A-5 | 7.53 | 1.03 | 0.58 | 2.456 | 59 |
| A-6 | 4.32 | 0.92 | 0.78 | 2.459 | 63 |
| A-7 | 13.56 | 1.02 | 0.63 | 2.463 | 55 |
| A-8 | 15.59 | 0.97 | 1.02 | 2.469 | 52 |
| A-9 | 11.2 | 0.93 | 0.95 | 2.464 | 54 |
| A-10 | 7.94 | 1.03 | 0.98 | 2.462 | 57 |
| DB-1 | 6.67 | 1.02 | 0.56 | 2.466 | 53 |
| DB-2 | 15.73 | 1.06 | 1.05 | 2.468 | 49 |
| DB-3 | 14.10 | 1.18 | 0.53 | 2.464 | 48 |
| DB-4 | 13.36 | 1.34 | 1.83 | 2.462 | 46 |

The ultrastable RE Y-type molecular sieve provided in accordance with the invention are characterized in that the molecular sieve contains 1-20 wt % of RE oxide, not more than 1.2 wt % of sodium oxide, and 0.1-5 wt % of phosphorus (in terms of P), and has a crystallinity of 51-69% and a lattice parameter of 2.449-2.469 nm.

As can be seen from the data in the above table, in the molecular sieves prepared in accordance with the invention, the sodium oxide accounts for not more than 1.2 m %, the RE oxide accounts for a range of 1-20 m %, the phosphorus accounts for a range of 0.1-5 m %, the unit cell constant is between 2.449 and 2.469, and the relative crystallinity is between 51% and 69%.

The molecular sieve products of Examples 1 to 10 and Comparative Examples 1 to 4 each, was subjected to three ammonium salt exchanges under the exchange conditions describe below, in order to investigate the change in rare earth contents in the molecular sieves and in the filtrate, so as to confirm whether or not the rare earth ions were located in sodalite cages. The Analytical results were shown in Table 2.

Exchange conditions: to a reaction kettle equipped with a heating mantle, 100 g molecular sieve and 0.6 L deionized water were added, and 40 g ammonium salt was added under stirring: the temperature was raised to 85° C., and an exchange was carried out for 1 hour, followed by filtration and washing with a 0.4 L chemical grade water; the filtrate and the filter cake were collected for analysis of rare earth content.

TABLE 2

Analysis of rare earth content

| Molecular Sieve No. | RE Oxide | |
|---|---|---|
| | On Molecular Sieve, m % | In Filtrate, g/L |
| A-1 | 15.69 | not detectable |
| A-2 | 6.89 | not detectable |
| A-3 | 10.41 | not detectable |
| A-4 | 15.43 | not detectable |
| A-5 | 7.46 | trace |
| A-6 | 4.59 | not detectable |
| A-7 | 12.36 | not detectable |
| A-8 | 15.54 | trace |
| A-9 | 11.38 | not detectable |
| A-10 | 8.14 | not detectable |
| DB-1 | 6.27 | 0.51 |
| DB-2 | 15.26 | 0.35 |
| DB-3 | 13.48 | 0.68 |
| DB-4 | 12.56 | 0.82 |

As can be seen from the analytical results in Table 2, compared with the comparative examples, the molecular sieves prepared by the Y-type molecular sieve modification method provided in accordance with the invention have no change in the rare earth content on the molecular sieve after three repeated ammonium salt exchanges, which shows that the rare earth ions are all located in sodalite cages in the molecular sieves.

Table 3 shows analytical results about the stability of the ultrastable RE Y-type molecular sieves obtained in Examples 1 to 10 and Comparative Examples 1 to 4.

TABLE 3

Analytical results about the activity stability of molecular sieves

| Molecular Sieve No. | Retention rate of Relative Crystallinity % | Collapse Temp, ° C. |
|---|---|---|
| A-1 | 68.4 | 1018 |
| A-2 | 71.1 | 1022 |
| A-3 | 73.4 | 1025 |
| A-4 | 69.8 | 1018 |
| A-5 | 68.4 | 1018 |
| A-6 | 69.8 | 1020 |
| A-7 | 69.3 | 1019 |
| A-8 | 70.2 | 1018 |
| A-9 | 71.6 | 1021 |
| A-10 | 70.3 | 1025 |
| DB-1 | 51.2 | 998 |
| DB-2 | 52.6 | 994 |
| DB-3 | 55.4 | 1002 |
| DB-4 | 55.8 | 994 |

Note:
Retention rate of Relative Crystallinity = relative crystallinity (aged sample)/relative crystallinity (fresh sample) × 100%

Aging condition: aging at 800° C., raider 100% steam for 2 h

The analysis data in Table 3 demonstrates that, as compared to the comparative molecular sieves, the molecular sieves prepared according to the invention have a molecular sieve collapse temperature increased by 15° C. or more, and a retention rate of relative crystallinity increased by 11.8% or more, which shows that the preparation methods provided in accordance with the invention can remarkably improve the thermal stability and hydrothermal stability of molecular sieves.

INDUSTRIAL APPLICABILITY

To investigate the heavy-oil-conversion capacity and the overall product distribution of the molecular sieves according to the invention, experiments were conducted as follows: an FCC catalyst was prepared on the basis of a catalyst formulation of 35% molecular sieves (including the molecular sieves of the present invention and the comparative molecular sieves), 20% aluminum oxide, 8% alumina sol binder and 37% kaolin, by the conventional preparation method for semi-synthetic catalysts. An evaluation in the heavy oil microreader was carried out under the following evaluation conditions: the crude oil was Xinjiang catalyzed material, the catalyst/oil ratio was 4, and the reaction temperature was 530° C. The evaluation results are shown in Table 4. The evaluation results show that the catalysts prepared using the Y-type molecular sieves provided in accordance with the invention as the active component have superior heavy oil conversion capacity and product selectivity.

TABLE 4

Evaluation results in ACE heavy oil microreactor

| | | Catalyst No. | | | | |
|---|---|---|---|---|---|---|
| | | 1 | 2 | 3 | 4 | 5 |
| Molecular Sieve | | A-1 | A-4 | A-8 | DB-1 | DB-4 |
| Mass | Dry gas | 2.97 | 2.79 | 2.84 | 2.75 | 2.75 |
| Balance m | Liquified gas | 23.52 | 23.03 | 23.66 | 21.81 | 22.33 |
| % | Gasoline | 52.42 | 52.92 | 52.25 | 53.19 | 52.07 |
| | Diesel | 9.87 | 10.49 | 10.20 | 10.04 | 10.65 |
| | Heavy oil | 3.55 | 3.98 | 4.09 | 5.29 | 4.71 |
| | Coke | 7.68 | 6.80 | 6.96 | 6.92 | 7.49 |
| | Total | 100 | 100 | 100 | 100 | 100 |
| Conversion, m % | | 87.08 | 85.94 | 85.71 | 84.68 | 84.64 |
| Total liquid yield, m % | | 85.81 | 86.44 | 86.11 | 85.04 | 85.05 |
| Light oil yield, m % | | 62.29 | 63.41 | 62.45 | 63.23 | 62.72 |

The invention accomplished on a basis that the NaY molecular sieve is used as a raw material, and no ammonium ion solution is added in the first exchange and the first calcination of the NaY molecular sieve, so as to prevent it from a competing reaction with the rare earth ions, which would otherwise reduce the utilization rate in the rare earth ion exchange; meanwhile, the dispersion pre-exchange is used to reduce exchange obstruction between particles and locate the rare earth ions in sodalite cages.

The method provided in accordance with the invention can effectively reduce agglomeration of molecular sieve grains and increase the dispersibility of the molecular sieve, while the intensity and density of acidic centers in the molecular sieve pore channels can be improved due to the phosphorus modification, thus the coke selectivity and the secondary utilization of active centers of the molecular sieve are increased. Moreover, the method greatly reduces the amount of ammonium salts used in the manufacture of the molecular sieves, and therefore represents a clean molecular sieve modification technique.

The invention claimed is:

1. A phosphorus-containing ultrastable rare earth Y-type molecular sieve, comprising 1-20 wt % of rare earth oxide, 0.1-5 wt % of phosphorus in terms of P, and not more than 1.2 wt % of sodium oxide, and has a crystallinity of 51-69% and a lattice parameter of 2.449-2.469 nm;
   wherein, the ultrastable rare earth Y-type molecular sieve is prepared from a NaY molecular sieve as a raw material, the preparation process comprising subjecting the raw material to a rare earth exchange, dispersion pre-exchange, and a first calcination to obtain a "one-exchanged one-calcinated" rare earth-Na Y-type molecular sieve, and subjecting the "one-exchanged one-calcinated" rare earth-Na Y-type molecular sieve to an ammonium salt exchange, phosphorous modification, and a second calcination, wherein the ammonium salt exchange and the phosphorus modification are carried out in an unlimited sequence, and the second calcination is carried out after reducing sodium by the ammonium salt exchange, wherein the rare earth exchange and the dispersion pre-exchange are carried out in an unlimited sequence, and are carried out continuously without a calcination process therebetween;
   wherein the dispersion pre-exchange refers to adjusting the slurry of the molecular sieve to have a concentration, in terms of a solid content, of 80-400 g/L, and adding thereto 0.2 wt % to 7 wt % of a dispersant to conduct the dispersion pre-exchange at an exchange temperature of 0 to 100° C. for an exchange duration of 0.1 to 1.5 hours; in the dispersion pre-exchange, the dispersant is selected from any one or more of sesbania powder, boric acid, urea, ethanol, polyacrylamide, acetic acid, oxalic acid, adipic acid, formic acid, hydrochloric acid, nitric acid, citric acid, salicylic acid, tartaric acid, benzoic acid and starch; no ammonium salt is used in the rare earth exchange and the dispersion pre-exchange.

2. The phosphorus-containing ultrastable rare earth Y-type molecular sieve according to claim 1, wherein the condition for the rare earth exchange is adjusting the slurry of the molecular sieve to have a concentration, in terms of a solid content, of 80-400 g/L, and adding thereto an amount of a rare earth compound in terms of $RE_2O_3$ such that the mass ratio of $RE_2O_3$/NaY molecular sieve is 0.005 to 0.25, at an exchange temperature of 0 to 100° C. and an exchange pH of 2.5 to 6.0 for an exchange duration of 0.1 to 2 hours.

3. The phosphorus-containing ultrastable rare earth Y-type molecular sieve according to claim 2, wherein the rare earth compound is rare earth chloride or rare earth nitrate or rare earth sulfate.

4. The phosphorus-containing ultrastable rare earth Y-type molecular sieve according to claim 1, wherein the rare earth is lanthanum-rich rare earth, cerium-rich rare earth, pure lanthanum or pure cerium.

5. The phosphorus-containing ultrastable rare earth Y-type molecular sieve according to claim 1, wherein the addition amount of the dispersant is 0.2 wt % to 5 wt %.

6. A method for preparing the phosphorus-containing ultrastable rare earth Y-type molecular sieve comprising 1-20 wt % of rare earth oxide, 0.1-5 wt % of phosphorus in terms of P, and not more than 1.2 wt % of sodium oxide, and has a crystallinity of 51-69% and a lattice parameter of 2.449-2.469 nm, the method comprising subjecting a NaY molecular sieve used as a raw material to a rare earth exchange, dispersion pre-exchange, and a first calcination to obtain a "one-exchanged one-calcinated" rare earth-Na Y-type molecular sieve, and subjecting the "one-exchanged one-calcinated" rare earth-Na Y-type molecular sieve to an ammonium salt exchange, phosphorous modification, and a second calcination, wherein the ammonium salt exchange and the phosphorus modification are carried out in an unlimited sequence, and the second calcination is carried out after reducing sodium by the ammonium salt exchange, wherein the dispersion pre-exchange refers to adjusting the slurry of the molecular sieve to have a concentration, in terms of a solid content, of 80-400 g/L, and adding thereto 0.2 wt % to 7 wt % of a dispersant to conduct the dispersion pre-exchange at an exchange temperature of 0 to 100° C. for an exchange duration of 0.1 to 1.5 hours; in the dispersion pre-exchange, the dispersant is selected from any one or more of sesbania powder, boric acid, urea, ethanol, polyacrylamide, acetic acid, oxalic acid, adipic acid, formic acid, hydrochloric acid, nitric acid, citric acid, salicylic acid, tartaric acid, benzoic acid and starch; no ammonium salt is used in the rare earth exchange and the dispersion pre-exchange.

7. The method according to claim 6, wherein the "one-exchanged one-calcinated" rare earth-Na Y-type molecular sieve is prepared by a process of firstly subjecting the NaY molecular sieve to the rare earth exchange, and filtering and washing it after the completion of reaction; subsequently mixing the filter cake with the dispersant uniformly for a pre-exchange reaction; and finally subjecting the filter cake to a drying by flash evaporation before the first calcination.

8. The method according to claim 6, wherein the "one-exchanged one-calcinated" rare earth-Na Y-type molecular sieve is prepared by a process of firstly subjecting the NaY molecular sieve to the dispersion pre-exchange, and filtering and washing it to obtain the filter cake after the completion of the reaction; mixing the filter cake with a solution of the rare earth compound uniformly for filter cake exchange; and subjecting the filter cake to a drying by flash evaporation before the first calcination, after the completion of the reaction.

9. The method according to claim 6, wherein the "one-exchanged one-calcinated" rare earth-Na Y-type molecular sieve is prepared by a process of firstly subjecting the NaY molecular sieve to the dispersion pre-exchange; subsequently adding thereto the rare earth compound for tank-type exchange; and performing filtering, washing and the first calcination after the completion of the reaction.

10. The method according to claim 6, wherein the "one-exchanged one-calcinated" rare earth-Na Y-type molecular sieve is prepared by a process of firstly subjecting the NaY molecular sieve to the rare earth exchange; adding thereto the dispersant for dispersion pre-exchange reaction after the completion of reaction; and finally performing filtering, washing and the first calcination.

11. The method according to claim 6, wherein the "one-exchanged one-calcinated" rare earth-Na Y-type molecular sieve is prepared by a process of firstly subjecting the NaY molecular sieve to the dispersion pre-exchange; subjecting the slurry of the molecular sieve to filtering, rare earth belt exchange and water-washing of the filter cake with water on a belt filter after the completion of reaction, wherein the rare earth belt exchange is carried out on the belt filter under a condition of an exchange temperature of 60 to 95° C., an exchange pH of 3.2 to 4.8, and a vacuum degree of 0.03 to 0.05 in the belt filter; and finally subjecting the filtered and water-washed filter cake to the first calcination.

12. The method according to claim 8, wherein the "one-exchanged one-calcinated" rare earth-Na Y-type molecular sieve is prepared by a process of performing, after the completion of the dispersion pre-exchange of the NaY molecular sieve, the rare earth exchange in a manner such that the solution of the rare earth compound is divided into several portions for tank-type exchange, belt exchange and/or filter cake exchange with a provision of the total amount of rare earth unchanged.

13. The method according to claim 6, wherein the "one-exchanged one-calcinated" rare earth-Na Y-type molecular sieve is prepared by a process of performing the dispersion pre-exchange of the NaY molecular sieve in a manner such that the dispersant is divided into several portions for tank-type exchange, belt exchange and/or filter cake exchange with a provision of the total amount of the dispersant unchanged.

14. The method according to claim 7, wherein the "one-exchanged one-calcinated" rare earth-Na Y-type molecular sieve is prepared by a process of firstly selecting a kind of dispersant for performing the dispersion pre-exchange together with the NaY molecular sieve; subsequently performing the rare earth exchange reaction; and adding thereto another kind of dispersant for a second dispersion pre-exchange after the completion of reaction, wherein the molecular sieve may be filtered or not filtered between the two dispersion pre-exchanges.

15. The method according to claim 6, wherein the condition for the ammonium salt exchange is adding the "one-exchanged one-calcinated" ultrastable rare earth-Na Y-type molecular sieve into deionized water; adjusting it to a solid content of 100-400 g/L, the mass ratio of $NH_4^+$/NaY molecular sieve of 0.02 to 0.40, and a pH of 2.5 to 5.0; and reacting at 60 to 95° C. for 0.3 to 1.5 hours.

16. The method according to claim 6, wherein the condition for the first calcination is calcinating the filter cake at 350° C. to 700° C. with 0 to 100% steam for 0.3 to 3.5 hours.

17. The method according to claim 6, wherein the phosphorus modification refers to adjusting the slurry of the "one-exchanged one-calcinated" molecular sieve to have a concentration, in terms of a solid content, of 80-400 g/L, and adding thereto 0.1 wt % to 5 wt % of a phosphorus-containing compound for exchange at an exchange temperature of 0 to 100° C. for an exchange duration of 0.1 to 1.5 hours.

18. The method according to claim 17, wherein the phosphorus-containing compound is selected from any one or more of phosphoric acid, phosphorous acid, phosphoric anhydride, diammonium phosphate, monoammonium phosphate, triammonium phosphate, triammonium phosphite, monoammonium phosphite, and aluminum phosphate.

19. The method according to claim 6, wherein, when the "one-exchanged one-calcinated" rare earth-Na Y-type molecular sieve is obtained, the slurry of the "one-exchanged one-calcinated" rare earth-Na Y-type molecular sieve is firstly subjected to the phosphorus modification for exchange, subsequently mixed with the solution of the ammonium salt uniformly for exchange, and filtered and washed to obtain the filter cake after the completion of the reaction; the filter cake is dried by flash evaporation before the second calcination.

20. The method according to claim 8, wherein the "one-exchanged one-calcinated" rare earth-Na Y-type molecular sieve is prepared by a process of firstly selecting a kind of dispersant for performing the dispersion pre-exchange together with the NaY molecular sieve; subsequently performing the rare earth exchange reaction; and adding thereto another kind of dispersant for a second dispersion pre-exchange after the completion of reaction, wherein the molecular sieve may be filtered or not filtered between the two dispersion pre-exchanges.

* * * * *